United States Patent [19]

Wakayama

[11] Patent Number: 4,535,626
[45] Date of Patent: Aug. 20, 1985

[54] DISPLAY SYSTEM TO INDICATE SAILING DATA OF A SMALL SIZE BOAT

[75] Inventor: Toshibumi Wakayama, Tokyo, Japan

[73] Assignee: Nippon Eurotec Co., Ltd., Tokyo, Japan

[21] Appl. No.: 587,379

[22] Filed: Mar. 8, 1984

[30] Foreign Application Priority Data

Sep. 5, 1983 [JP] Japan ................................ 58-162972

[51] Int. Cl.³ ............................................. G01C 21/10
[52] U.S. Cl. ......................................... 73/187; 73/185
[58] Field of Search ................. 73/187, 185, 181, 182, 73/183, 184, 186, 178 R

[56] References Cited

U.S. PATENT DOCUMENTS 4,324,135 4/1982 Peyton .................................. 73/187

*Primary Examiner*—Donald O. Woodiel
*Attorney, Agent, or Firm*—Donald D. Mon; David O'Reilly

[57] ABSTRACT

A display system for indicating sailing data to an operator of a small sized sailing boat in which a speed sensor in the hull transmits pulses to a speed measuring device which stores the data in a memory. The sailing data is periodically transmitted to a receiver worn by the boat operator either on his wrist or some conveniently viewable position.

3 Claims, 4 Drawing Figures

DISPLAY SYSTEM TO INDICATE SAILING DATA OF A SMALL SIZE BOAT

A display system to indicate sailing data, such as, speed, mileage and the like, of a small size and simple type boat comprising:
- a speed detecting sensor set up on the hull,
- a speed measuring means to process pulses from said sensor,
- a memory means to store the sailing data processed in said speed measuring means,
- a transmitting means to read the data, modulate and radio-transmit it periodically,
- a receiving means of wristwatch type, separated from said transmitting means, to receive and display the data, the radio-communication being done by using weak electric waves.

The sailing data can be always checked in various positions on the boat and maintained completely even if the boat is capsized.

BACKGROUND OF THE INVENTION

This invention relates to a display system which indicates sailing data of a small size boat, such as, speed, mileage and the like. More particularly, this invention relates to a display system in which a receiving means of a wristwatch type is separated from a transmitting means and is usually put on a boatman's wrist so as to easily check the sailing data, and in which the data is stored in a memory means and then transmitted periodically to the receiving means, the data being maintained in the memory even when the boat is capsized and able to be received soon after it is afloat.

Recently, small and simple sailing boats such as wind surfboats, dinghy type yachts and the like are very popular. Many kinds of display systems to indicate the sailing speed, mileage, total mileage, etc. of such sailing boats have been developed. A conventional display system of a dinghy type yacht is shown in FIG. 1, wherein numeral 101 designates a hull and numeral 102 designates a sail. A sailing speed sensor 103 is set up on the bottom of the hull 101 and connected to an indicator 105 provided with a calculating means through a leading wire 104.

In such a system, pulses generated from the speed sensor 103 are transmitted to the calculating means in the indicator 105 through the leading wire and processed, and the data thus obtained is displayed on the indicator 105 as, for example, a sailing speed. While the indicator 105 is fixed on the dashboard or any other place on the hull and connected with the sensor 103 by the wire 104, a boatman can watch the indicator 105 only from a limited position on the boat. It is particularly necessary for the boatman on this kind of boat to watch the indicator in various positions or from every angle. Thus, conventional display systems have not been used effectively in the case of small sized sailing boats. Further, as they are often capsized unexpectedly, it is impossible to check the indicator soaked under water and that their sailing data is occasionally washed away.

SUMMARY OF THE INVENTION

Accordingly, it is an object of this invention to provide a display system in which a receiving means of wristwatch type is separated from a transmitting means so as to easily check the sailing data in various positions on the boat.

Another object of this invention is to provide a display system to indicate the sailing data of a small size boat in which the data is stored in a memory means and then transmitted periodically to a receiving means by radio communication thereby the data being maintained in the memory during capsizations.

According to this invention, these and further objects can be accomplished by providing a display system to indicate the sailing data, such as, speed of a small size boat comprising:
- a speed detecting sensor set up on the hull,
- a speed measuring means connected to said sensor in which pulses therefrom are received and processed,
- a memory means connected to said speed measuring means in which sailing data thus processed is stored,
- a transmitting means connected to said memory means in which the data thus stored is read, modulated and radiotransmitted periodically,
- a receiving means of wristwatch type, separated from said transmitting means, in which the data thus transmitted is received and displayed on an indicator, the radio communication being done by using weak electric waves.

DETAILED DESCRIPTION

Figure 1:
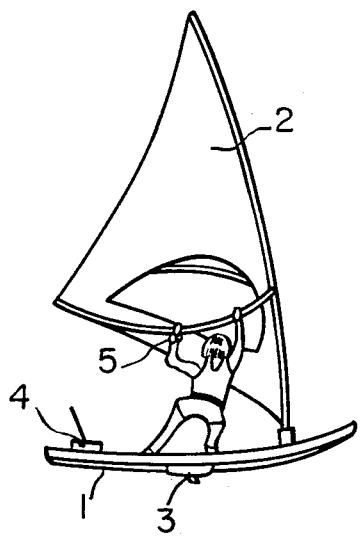
FIG. 1 is an illustration of a preferred embodiment of this invention in which a display system is applied to a wind surfboat.
Figure 3:
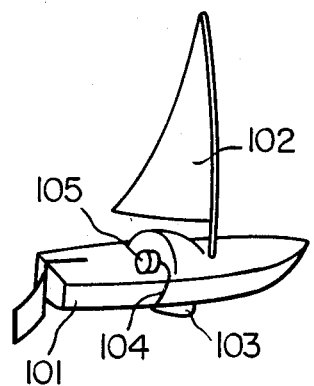
FIG. 3 is an illustration of a conventional display system.
Figure 2:
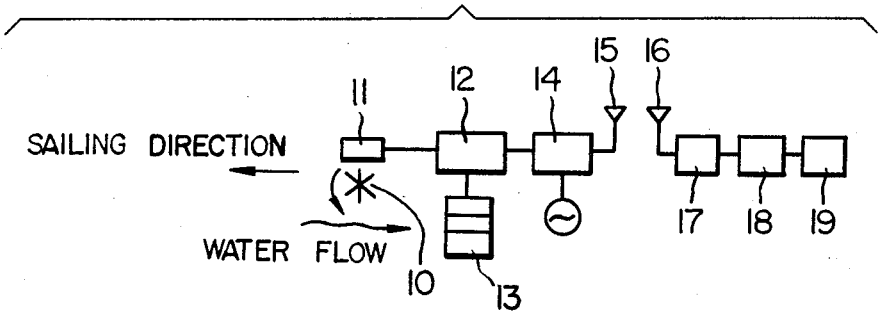
FIG. 2 is a block diagram of the system of FIG. 1.

Referring now to FIGS. 1 and 2, numeral 1 designates a hull and numeral 2 designates a sail. A speed detecting means 3 is fixed on the bottom of the hull 1 which comprises, as shown in FIG. 2, a speed detecting mechanism 10, for example, a rotary blade or propeller and a speed detecting sensor 11 incorporated in the mechanism. The speed detecting mechanism 10 is rotated by water flow as the hull moves by sail, and pulses are taken out of the mechanism 10 by means of the sensor 11. Numeral 4 designates a transmitter where weak electric waves are used comprising, as shown in FIG 2, a speed measuring means 12, a memory means 13 connected thereto, a transmitting means 15 connected to the memory means 13 through the measuring means 12, and an antenna 15 fixed thereon. The speed measuring means 12 is connected to the sensor 11, and receives pulses generated therefrom. Received pulse sequences are counted in the measuring means 12, aligned in data strings and processed to classify into groups, such as maximum speed, average cruising speed, total mileage and the like, which are then stored in the memory means 13, respectively. In the transmitting means 14, the data stored in the memory means 13 is read at regular intervals, for example, every 560 milliseconds, and radio-transmitted through the antenna 15 after it is modulated.

Figure 4:
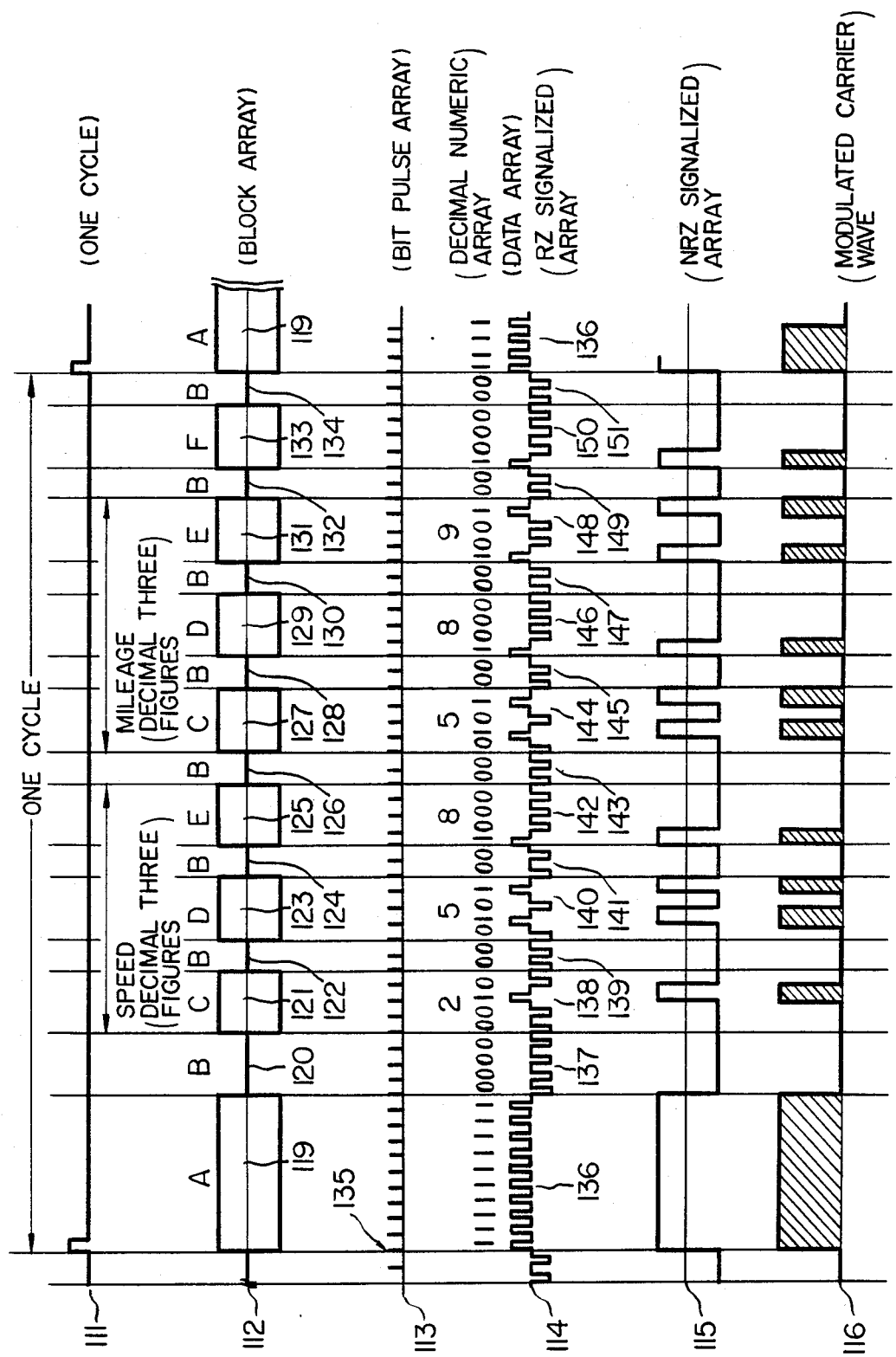
FIG. 4 is an operational diagram of transmission and reception in this invention.

Numeral 5 designates a receiving means comprising a receiving antenna 16, a detecting and wave-form shaping means 17, a LSI-central processing unit (CPU) 18 to process the data received, and a liquid crystal indicator 19. The radio-transmitted data from the means 14 through the antenna 15 is caught by the other antenna 16, demodulated to a wave form 132 as shown in FIG. 4 and decoded in LSI-CPU 18, thereby the liquid crystal indicator 19 is driven through a liquid crystal driver to display desired sailing data expressed numerically. The receiving means 5 is of wristwatch type, while transmission and reception are done by means of weak electric waves.

Referring to FIG. 4, a mode of transmission and reception in this invention will be more fully described.

In FIG. 4, numeral 111 designates one cycle time required to read out desired data at certain time from the memory means 13, and numeral 112 designates an arrangement of data blocks assigned within one cycle time. In FIG. 4, A, B, C, D, E and F represent a reset pulse, a quiescent, the tens digit, the units digit, the tenths digit and a check block, respectively. As shown in FIG. 4, 100 milliseconds are assigned, by way of illustration, to a set pulse 119, and 40 milliseconds to a quiescent time 120. The sailing speed is expressed by a decimal number of three figures ranging from the tens to tenths digits which forms an array of numerals 121 to 125. Similarly, the mileage is expressed by a decimal number of three figures ranging from the tens to tenths digits which forms an array of numerals 127 to 131. Numeral 133 designates a redundant bit block to control and check an error correction or binary signal array. To the quiescent time 122, 124 and 126 to 134, and to the data blocks 121, 123 and 125 to 133 are assigned 20 and 40 milliseconds, respectively. A bit pulse array 113 is provided in CPU 18 so that four bits as to the data array and ten bits as to the block array of the reset pulse are taken therein, and a data array 114 corresponding to the bit pulse is formed. A reset pulse block 119 includes ten of "1" as shown by numeral 136. The quiescent time 120 corresponds to four "0". Numerals 138, 140 and 142 mean decimal numbers "2", "5" and "8", respectively (i.e., 25.8). As the sailing speed is expressed by knot, it represents 25.8 knots. Similarly, numerals 144, 146 and 148 correspond "5", "8" and "9", respectively, which represent an actual mileage of 58.9 knots. Numeral 150 designates a redundant bit for parity check, and an even partiy is added in the example. Numeral 115 designates NRZ (No Return to Zero)—signalized wave form, which contributes to much reliable data transfer. Numeral 116 designates a wave form of transmitted output while interrupting the transmission cycle in FIG. 2 or the carrier wave by the wave form 115. The wave form 116 is converted inversely on the side of receiver, and thus the wave form 115 is formed after detection which is then taken in CPU 18 to demodulate the data array similarly as usual computer processing. The numeric segment on the surface of the liquid crystal indicator is then driven through the driver, and a series of operation in this invention is completed.

In the example, 560 milliseconds are assigned to one cycle time. Thus, in FIG. 2, the data stored in the memory means 13 is read out every 560 milliseconds, transmitted and received in the way described above, and at last digitally displayed on the indicator. While the data in the memory means 13 is always rewritten and is read out every 560 milliseconds, it is possible to receive and display the new data when the normal state of reception is recovered in a short time, even if the transmitter is submerged accidentally. Further, the digital data of the receiving means is displayed continuously until the next reset pulse is received, and the data cannot be washed away or displayed abnormally.

Having described this invention as related to the embodiment shown in the accompanying drawing, it is our intention that this invention be not limited by any of the details of description, unless otherwise specified, but rather be construed broadly within its spirit and scope as set out in the accompanying claims.

I claim:

1. A display system to indicate the sailing data, such as, speed of a small size boat comprising:
   a speed detecting sensor set up on the hull,
   a speed measuring means connected to said sensor in which pulses therefrom are received and processed,
   a memory means connected to said speed measuring means in which sailing data thus processed is stored,
   a transmitting means connected to said memory means in which the data thus stored is read, modulated and radiotransmitted periodically,
   a receiving means of wristwatch type, separated from said transmitting means, in which the data thus transmitted is received and displayed on an indicator,
the radio communication being done by using weak electric waves.

2. A display system claimed in claim 1, in which said system is applied to a wind surfboat.

3. A display system claimed in claim 1, in which said system is applied to a dinghy type yacht.

* * * * *